United States Patent [19]

Schijven

[11] Patent Number: 4,564,874
[45] Date of Patent: Jan. 14, 1986

[54] CASSETTE RECORDER WITH FREELY PIVOTING EJECTION LEVER

[75] Inventor: Lucas W. M. Schijven, Eindhoven, Netherlands

[73] Assignee: U.S. Philips Corporation, New York, N.Y.

[21] Appl. No.: 399,936

[22] Filed: Jul. 19, 1982

[30] Foreign Application Priority Data

Aug. 17, 1981 [NL] Netherlands .................. 8103832

[51] Int. Cl.⁴ .................................... G11B 15/68
[52] U.S. Cl. .................... 360/96.1; 360/96.5; 242/199
[58] Field of Search .............. 360/93, 96.1, 96.3, 360/96.4, 105, 73, 74.1, 137, 96.5; 242/197-202

[56] References Cited

U.S. PATENT DOCUMENTS

| | | | |
|---|---|---|---|
| 4,069,506 | 1/1978 | Ueno | 360/96.5 |
| 4,280,154 | 7/1981 | Ando | 360/105 |
| 4,348,704 | 9/1982 | Takagi et al. | 360/105 |
| 4,369,474 | 1/1983 | Kamimura et al. | 360/96.1 |
| 4,374,401 | 2/1983 | Takai | 360/96.5 |

Primary Examiner—Stuart N. Hecker
Assistant Examiner—David J. Severin
Attorney, Agent, or Firm—David R. Treacy

[57] ABSTRACT

A magnetic tape cassette apparatus having a pressure roller and a magnetic head on a head bracket, movable to a pause position in which the head contacts a tape in the cassette but the pressure roller is disengaged. Insertion of a cassette into a compartment pivotally moves an ejection lever which is coupled to an ejection member so as to tension an ejection spring during movement of the ejection member from a rest position to an actuated position. A latching member latches the ejection member in the actuated position, leaving the ejection lever free to pivot relative to the ejection member, at least over a limited distance.

20 Claims, 4 Drawing Figures

CASSETTE RECORDER WITH FREELY PIVOTING EJECTION LEVER

BACKGROUND OF THE INVENTION

The invention relates to a magnetic-tape cassette apparatus comprising a chassis, on which a head support carrying a pressure roller and a magnetic head is mounted so as to be movable; a drive plate carrying drive means for a capstan and at least one winding mandrel; and a cassette compartment for receiving a magnetic-tape cassette (hereinafter referred to as a cassette recorder). Such apparatus are used for recording, or recording and playback, or playback only. In particular, the invention relates to a cassette recorder having an ejection lever pivotally mounted in the cassette compartment. The lever is pivoted to an end position upon insertion of a cassette into the cassette compartment, an ejection spring which is coupled to the ejection lever being tensioned during the pivotal movement of the ejection lever. During this pivotal movement the lever also actuates switching means for moving the head support towards the cassette.

In a known magnetic-tape cassette apparatus of the above type the lever itself is latched after the insertion of the cassette and the pivotal movement of the ejection lever. This latching is necessary to keep the ejection spring in the tensioned condition as long as the cassette is present in the cassette compartment. In order to latch the ejection lever upon insertion of the cassette, the lever has to be pivoted further than is necessary for positioning the cassette in the cassette compartment. Therefore, some space is required at the back of the cassette compartment to allow the further pivotal movement of the ejection lever. Moreover, this space is necessary in order to latch the lever in such a position that it is clear of the cassette. If the lever is not clear of the cassette an undesired force may be exerted on the cassette.

The necessity of providing space for the ejection lever overtravel means that for this known construction a comparatively large space is required at the back of the cassette compartment. Moreover, when the apparatus is used intensively, it is not always guaranteed that the ejection lever is entirely clear of the cassette upon insertion of the cassette.

SUMMARY OF THE INVENTION

It is an object of the invention to construct a cassette recorder in such a way that after the insertion of the cassette the ejection lever cannot exert any undesired forces on the cassette, while minimizing the space required by the construction used for this purpose.

According to the invention the ejection spring is connected to an ejection member, which at least during insertion of the cassette is coupled to the ejection lever under the influence of the ejection spring and which can be moved in a first direction from a rest position into an actuated position by the pivotal movement of the ejection lever; and during this movement of the ejection member the ejection spring is tensioned. The apparatus includes latching means for latching the ejection member in the actuated position. When the ejection member is in the actuated position, the connections permit the ejection lever to be pivoted freely, at least over some distance, relative to the ejection member. This results in an apparatus comprising an ejection lever which after insertion of the cassette is freely pivotable over some distance and is disengaged from the ejection member, so that the cassette can be positioned correctly on the apparatus without being impeded by the ejection lever. When the apparatus is used at higher ambient temperatures, as for example in cars in summer, the ejection lever cannot exert a force which gives rise to mechanical deformation of the cassette. Furthermore, only a small additional space is required for the movement of the ejection lever upon insertion of the cassette.

In a preferred embodiment of an apparatus in accordance with the invention the ejection lever bears against a stop on the ejection member when the ejection spring is tensioned, and in the actuated position of the ejection member the ejection lever is freely pivotable between stops relative to the ejection lever. Thus, the ejection lever and the ejection member are only coupled during insertion of the cassette, and this coupling is interrupted in a reliable manner upon latching of the ejection member.

In a preferred embodiment of an apparatus in accordance with the invention the ejection member is connected to the ejection lever by a pin-and-hole connection, edges of the hole constituting the stops for the pivotal movement of the pin. This construction provides a reliable coupling between the ejection lever and the ejection member during tensioning of the ejection spring, permitting a limited pivotal movement of the ejection lever both in the absence of the cassette and after insertion of a cassette.

A spindle about which the ejection lever is pivotable may also guide the ejection member in its movement in the first direction. This ensures an accurate guidance of the ejection member towards the latched actuated position.

In this respect it is of advantage if the ejection spring is connected to the ejection member in such a way relative to the spindle that during tensioning the ejection spring tends to pivot the ejection member about the spindle in a second direction of movement. Such a movement in a second direction may be used for latching the ejection member in the actuated position.

Preferably, the ejection member is further guided by a guide slot in a support and comprises a narrowed-end portion which upon completion of the movement in the first direction is pivoted in the second direction in the guide slot, the edge of the guide slot, as part of the latching means, preventing a further movement of the ejection member in the first direction after the movement in the second direction. Thus, the ejection member is reliably latched in a comparatively simple manner.

In this respect it is also of advantage if a pivotal member is provided on which a spindle is mounted, which spindle is situated in a slot in the ejection member. During the movement of the ejection member in the first direction the slot slides along the spindle, and during the movement in the second direction the spindle is displaced by the ejection member. During this movement of the ejection member in the second direction the spindle then enables the switching means of the apparatus to be controlled during tensioning of the ejection spring.

In this embodiment the apparatus includes a latching member which, during the movement of the ejection member in the second direction, is coupled to the spindle and the pivotal member is moved thereby so as to unlatch a control member of the switching means, which control member controls a subsequent movement of the drive plate and the head support towards the cassette. This construction provides the possibility of having the switching means of the apparatus perform certain functions in a specific time sequence during tensioning of the ejection spring.

An advantageous construction is obtained if the control member carries a latching pin which forms part of the latching means and which after unlatching of the control member is moved to an active position by a switching spring, in which position the latching pin is coupled to the ejection member to latch the ejection member in the actuated position. This ensures that the ejection member is not only latched behind the support and cannot move further in the first direction but also prevents a return movement in a direction opposite to the second direction. This results in a very reliable latching of the ejection member.

In this respect a preferred embodiment of an apparatus in accordance with the invention is characterized in that the switching means also comprises a switching member which via the switching spring is coupled to the control member and which during a part of the movement of the ejection member in the first direction is coupled to the ejection member, as a result of which coupling the switching spring is tensioned. The switching spring causes the control member with the latching pin to be moved to the active position after unlatching of the control member. Thus, the switching spring ensures that the control member is rapidly and reliably moved to the active position.

In a further embodiment, an apparatus in accordance with the invention is characterized in that in the coupled position the switching member tends to pivot the ejection member about the spindle in the second direction of movement under the influence of the force exerted by the switching spring in conjunction with the ejection spring. This ensures in a reliable manner that the ejection member is moved to the latched position upon insertion of the cassette.

An embodiment of the invention will be described in more detail, by way of example, with reference to the drawings.

DESCRIPTION OF THE PREFERRED EMBODIMENT

Figure 1:
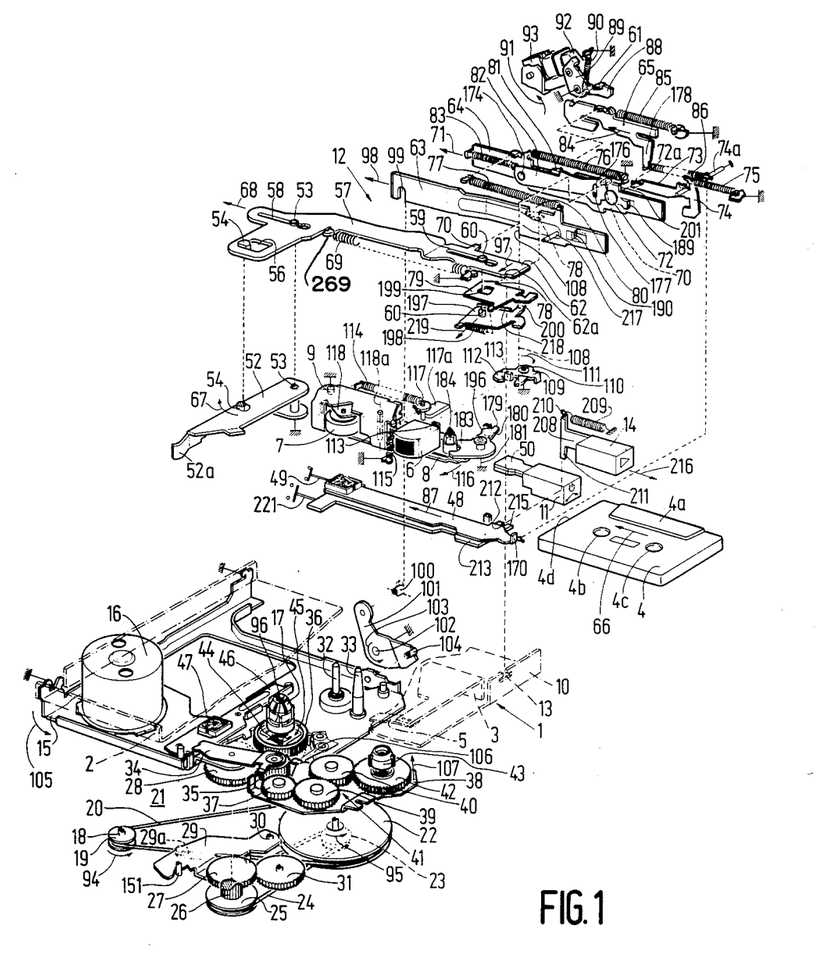
FIG. 1 is an exploded perspective view of those parts of a magnetic-tape cassette apparatus in accordance with the invention which are relevant to the invention, the apparatus being shown in the play mode of operation.

The cassette recorder shown in FIG. 1 has a chassis 1 suitably constructed so that the apparatus can be accommodated in a space of limited dimensions. An example of this is a combined use in conjunction with a car radio. Other uses, such as incorporation in a portable radio, are equally possible. For defining a cassette compartment the chassis 1 comprises an upright guide edge 2 and an L-shaped support 3, which edge and support also serve for guiding a magnetic-tape cassette 4 of the so-called "Compact-Cassette" type described in the U.S. Pat. No. 3,394,899. The guide edge 2 and the support 3 are so arranged relative to each other that during insertion the cassette is guided to the longitudinal direction, a leaf spring 5 on the support 3 ensuring that the cassette is pressed against the chassis 1. The support 3 has sufficient height relative to the chassis 1 to permit the passage of the raised front portion 4a of the cassette 4, the leaf spring 5 acting on the adjacent major surface of the cassette 4. The raised front portion 4a has a number of openings in the front through which a magnetic head 6 and a pressure roller 7 can pass for cooperation with a magnetic tape in the cassette 4 during operation. The magnetic head 6 and the pressure roller 7 are arranged on a head support 8, which is pivotable about a spindle 9 on the chassis 1.

Adjacent the support 3 the chassis comprises an upright portion forming a support 10 which supports an actuating button 11. The support 10 has a number of guide slots in which a number of elongate members of a switching mechanism or means 12 of the apparatus are guided. Only one guide slot 13 is shown, for guiding an elongate ejection member 57, whose operation will be described in more detail hereinafter. The support 10 also supports a play or a start button 14, whose operation will also be described hereinafter.

DRIVE MECHANISM

At the side of the chassis 1 which is remote from the support 3 a drive plate 15 is pivotably mounted underneath the chassis 1. The plate 15 is secured to the chassis 1 in such a way as to be pivotable about an axis which is perpendicular to spindle 9 and to the longitudinal direction of the cassette 4 in the cassette compartment. On the drive plate 15 an electric motor 16 and a take-up mandrel 17 are mounted. On the motor shaft 18 a pulley 19 is mounted, for driving a drive means 21 through a belt 20. The drive means comprises a flywheel 22 having a circumferential groove for receiving the belt 20. The flywheel is rotatably journalled on the drive plate 15 and is rigidly connected at its lower side to a pulley 23. A belt 24 passes around the pulley 23 and a further pulley 25 which is rigidly and coaxially connected to a comparatively small gear-wheel 26 and a large gear-wheel 27. The teeth of the small gear-wheel 26 are in mesh with the teeth of an idler wheel 28 which is rotatably mounted on an arm 29, which arm is pivotally connected to the drive plate 15 by a spindle 30. A tension spring 29a connected between the arm 29 and the plate 15 holds the arm 29 in a position where the teeth of the idler wheel 28 are also in mesh with the teeth of a gear wheel 31 coaxially arranged underneath the take-up mandrel 17. The gear 31 is coupled to the mandrel by a slipping clutch, not shown. A capstan 32 rigidly connected to the flywheel is arranged on the upper side of the drive plate 15. Openings in the chassis 1 allow the capstan 32 and a cassette locating pin 33, also carried on the drive plate 15, to pass through the chassis into the cassette when the drive plate is pivoted upward.

A spindle mounted on the drive plate 15 coaxially with the gear wheels 27 and 26 carries a pivotable swing arm 34. At a free end the arm 34 carries an idler wheel 35, which in the play mode shown in FIG. 1 is in mesh only with the teeth of the large gear-wheel 27. In a manner to be described hereinafter the idler wheel 35 can be brought additionally into mesh, by a pivotal movement of the arm 34, with a gear-wheel 36 which is rigidly connected coaxially to the take-up mandrel 17, or with a gear-wheel 37 which is rotatably journalled on an auxiliary frame 38. In addition to the gear-wheel 37 two gear-wheels 39 and 40 are rotatably mounted on the auxiliary frame 38. These gears together with the gear-wheel 37 constitute transmission means 41 for driving a gear-wheel 42 which is rigidly connected coaxially to a supply mandrel 43. In the chassis 1 two additional openings are formed for the winding mandrels 17 and 43, so that when the drive plate 15 is pivoted upwards the winding mandrels can engage the winding hubs 4b and 4c in the cassette 4.

The auxiliary frame 38 can be moved translationally upwards and downwards relative to the chassis 1 in a manner (not shown) such that the auxiliary frame 38 is moved towards the chassis almost simultaneously with the upward pivotal movement of the drive plate 15. Thus, the winding mandrels 17 and 43 are situated below the chassis 1 during insertion of the cassette 4 and, in a manner to be described hereinafter, are passed through the openings in the chassis to engage with the hubs 4b and 4c respectively upon completion of the insertion of the cassette.

On the upper side of the gear-wheel 36, brushes or sliding contacts 44 are arranged, which constitute the rotary parts of a tachometer 45 situated underneath the winding mandrel 17. When the drive plate 15 is swung up the brushes 44 come into contact with a stator, not shown, of the tachometer 45, which stator is mounted on a printed-circuit board on the underside of the chassis 1. A switching bar 46 is arranged to be rectilinearly movable on the upper side of the drive plate 15. This bar 46 can actuate an electric switch 47, whose contacts are mounted on the printed-circuit board, not shown, which is secured on the underside of the chassis. A further switching bar 48 is arranged at the underside of the chassis 1, for actuating an electric switch 49.

CONTROL MECHANISMS

The actuating button 11 is rigidly connected to a lug 50, which can be pivoted in a horizontal plane relative to the chassis 1 and which is guided to be slidable in a direction perpendicular to the support 10. The lug 50 is coupled to a switching mechanism 51 (see FIG. 2) to be described in more detail hereinafter.

In the cassette compartment an ejection lever 52 is arranged on the upper side of the chassis 1 for pivotal movement about a spindle 53. When the cassette 4 is inserted in its longitudinal direction into the cassette compartment the ejection lever is pivoted in a manner to be described hereinafter. A pin 54 on the upper side of the lever 52 engages a rectangular hole 56 in the ejection member 57. The member 57 forms part of the switching means 12 and is rectilinearly movable in a direction parallel to the longitudinal direction of the magnetic-tape cassette 4 in the cassette compartment, one end of the member 57 being guided in the slot 13 of the support 10. To control this movement a slot 58 is formed in the ejection member 57, and a further slot 59 is formed in the member 57 through which a spindle or pin 60 is passed. The spindle 60 is rigidly connected to a pivotal member 197, to be described in more detail hereinafter. The member 197 comprises a lug 200, which is pivotable about a stop, not shown, on the chassis 1.

The hole 56 is shown rectangular, for assembly purposes. In principle, the guide opening for the pin 54 may, for example, be triangular. However, it is essential that the pin 54 has sufficient clearance in the bottom-left corner of the hole to allow a free pivotal movement of the ejection lever 52. Viewed in the transverse direction of the member 57, an end portion 62 thereof is slightly narrowed so that, in a manner to be described hereinafter, an edge 62a of the member 57 can engage behind the support 10 in the play mode of the apparatus.

The switching means 12 further comprises an elongate control member 63, which controls the pivotal movement of the drive plate 15; an elongate switching member 64, which controls the head support 8, and a play member 65, which actuates the switching bar 48 and thus the switch 49, and also controls the head support 8.

For clarity, in each figure only those parts are shown which are relevant to the specific mode of operation of the apparatus. Parts which are not relevant to that mode are not shown in the figure in question. The various parts of the apparatus will be described in more detail with respect to for the various modes of operation of the apparatus.

A. PLAY MODE

When the cassette 4 is inserted in the longitudinal direction as indicated by the arrow 66 the end wall 4d of the cassette engages and presses against the free end 52a of the ejection lever 52. In its resulting pivotal movement about the spindle 53, as viewed in FIG. 1, the ejection lever 52 moves the pin 54 in the direction of the arrow 67 from the top-left corner of the hole 56 along the edge of the hole to the bottom-left corner. In this movement the pin 54 drives the member 57 in the longitudinal direction as indicated by the arrow 68, so that the slot 58 is moved relative to the spindle 53 in the direction of the arrow 68 into the position shown in FIG. 1. At the same time an ejection spring 69 in the form of a tension spring connected between the member 57 at a location 269 and the chassis 1 is tensioned. During its movement in the direction of the arrow 68, a lug 70 on the ejection member 57 moves the switching member 64, the switching member being rectilinearly movable in the direction of an arrow 71 parallel to the arrow 68. The member 64 carries a cam 72 with a spindle 72a which is guided along an edge 73 of a hook 74 during a movement in the direction of the arrow 71. At the end the edge 73 slopes downwards, so that as the spindle 72a moves along this part of the edge 73, the hook 74, under the influence of a tension spring 75 arranged between the hook and the chassis 1, performs a slight pivotal movement about the spindle 74a in a vertical plane, the travel being approximately 1 mm in the present embodiment. However, this movement suffices to latch the hook beneath a part of the chassis, so that the hook occupies a fixed position. As a result of this pivoting movement, the spindle 72a is positioned behind the end of the part of the hook 74 on which the edge 73 is formed, thereby latching the switching member 64 in its extreme position at the end of its movement in the direction of the arrow 71. Thus, the hook 74 functions as a main latch of the latching means of the apparatus. A tension spring 76, which is arranged between the member 64 and the chassis, is tensioned during the movement of the member 64 in the direction of the arrow 71, but because of the latching function, the spring is not capable of returning the member 64. The movement of the member 64 also tensions a switching spring 77 arranged between the member 64 and the control member 63. The member 63 cannot move yet, however, because a lug 78 on a latching member 79 engages a recess 80 in the member 63 and thereby prevents a movement of the member 63.

The play member 65 has a lug 81, which during the movement of the switching member 64 in the direction of the arrow 71 engages a shoulder formed on an auxiliary member 82 which is pivotally connected to the switching member 64. The lug 70 engages another shoulder on the auxiliary member 82, so that indirectly the auxiliary member 82 forms a coupling between the ejection member 57 and the play member 65. A tension spring 83 tends to pivot the auxiliary member 82 upwards, to ensure that at the beginning of each movement in the direction of the arrow 71 the auxiliary member 82 occupies an upper pivoted position. Because of this engagement of the lug 81 by the member 82 the play member 65 is moved in the direction of the arrow 84, parallel to the arrow 71. A pause spring 85 formed by a tension spring arranged between the member 65 and the chassis is tensioned by this movement. A coupling spring 86 also is tensioned, which spring is arranged between the member 65 and one end of the switching bar 48. As a result of this, the switching bar 48 is also moved in the direction of the arrow 87, so that the switch 49 is closed.

As the play member 65 is moved a pin-like lug 61 on the member 65 slides over a cam 88 formed on a bell-crank lever 89 which is pivotably connected to the chassis, a tension spring 90 tending to pivot the bell-crank lever 89 in the direction of the arrow 91. This pivotal movement is possible as soon as the lug 61 has passed over the cam 88 and allows an armature 92 arranged on the bell-crank lever 89 to move against the core of a solenoid 93, which solenoid will be referred to herein as the "play solenoid". Simultaneously, the switch 49 is closed by the movement of the switching bar 48, as described above, so that the play solenoid 93 is energized and thereby keeps the bell-crank lever 89 in the pivoted position. The play member 65 is then latched in the position of maximum displacement (play position) in the direction of the arrow 84, because of the engagement of the lug 61 behind the cam 88. The spring 85 remains tensioned owing to the action of the solenoid 93, so that the bell-crank lever 89 functions as a latch.

When the switch 49 is closed by the movement of the switching bar 48 the motor 16 is also energized. The pulley 19 begins to rotate in the direction indicated by the arrow 94 and the flywheel 22 also begins to rotate in the direction of the arrow 95. The capstan 32, which is connected to the flywheel, and the pulley 23 then also begin to rotate. Via the belt 24, and pulley 25, the small gear-wheel 26, the idler wheel 28 and the gear-wheel 31, the take-up mandrel 17 is set into rotation in a direction indicated by the arrow 96. It is to be noted that this switching sequence, which occurs prior to a further actuation of the switching means 12 and, in particular, a pivotal movement of the drive plate 15 to the active position, serves to prevent tape spillage in the magnetic-tape cassette.

Due to the movement of the ejection member 57 in the direction of the arrow 68 the spring 77, assisted by the spring 76, exerts a force on the member 57 near one end thereof through the lug 70. Because the spring 69 exerts a force on the member 57 near the other end thereof, the member 57 is subjected to a clockwise moment as viewed in FIG. 1. Since the pin 54 has reached the bottom-left corner of the hole 56, the member 57 can now pivot about the pin 54. Consequently, the end portion 62 of the member 57 is moved in the direction of the arrow 97. As a result, the lug 70 is no longer retained behind auxiliary member 82. As the spindle 60 is situated in the slot 59 in the member 57, the edge of that slot presses against the spindle 60 and moves it in the direction of the arrow 219 together with the pivotal member 197. As it moves in the direction of the arrow 219 the spindle 60 pushes against the latching member 79 and the lug 78 of the latching member 79 is withdrawn from the slot 80 in the control member 63. Since, as already described, the tension spring 77 has been tensioned during the preceding movement of the switching means the control member 63 now springs in the direction of the arrow 98, which direction is parallel to the direction indicated by the arrow 71.

On the side of the member 63 is a latching pin 217, which subsequently, at the end of the movement of the member 63 and the pivotal member 197 to an active position, engages an edge 218 of the pivotal member 197 and prevents this member from moving back. As a result of the movement of the end portion 62 of the ejection member 57 in the direction of the arrow 97, the edge 62a of the end portion 62, after passing out of the guide slot 13 in the support 10 on the chassis 1, engages behind the support 10. As a result of this movement the member 57 becomes latched behind the support 10 under the tension of the ejection spring 69. The pin 217, indirectly via the member 197, prevents the member 57 from moving back, in the opposite direction to the arrow 97, so that the pin 217, with the support 10, forms part of the latching means for the member 57. In this position of the member 57, the ejection lever 52 can pivot freely over some distance, which is determined by the edge of the hole 56, which edge acts as a stop, and by the cassette wall 4d. Thus, in the actuated position of the member 57 the ejection lever 52 exerts no force on the cassette 4, so that impact forces which may occur during switching of the switching means 12 cannot be transmitted to the cassette 4 via the lever 52.

In this respect it is also essential that the leaf spring 5 can exert sufficient pressure on the cassette 4 without being impeded by the spring 69 in order to ensure a correct positioning of the chassis 1. A further advantage at higher ambient temperatures is that no pressure occurs which may give rise to mechanical deformation of the cassette.

The member 63 has a recess 99 in which a pin 100 is disposed. This pin forms part of a member 101 which is pivotally connected to the chassis 1. The displacement of the control member 63, in the direction of the arrow 98, causes the pin 100 and with it the member 101 to perform a pivotal movement about the pivotal axis 102 of the member 101 in the direction of the arrow 103. Consequently, a pin 104 on the member 101 will move in the counter-clockwise direction, as viewed in FIG. 4. The pin 104 is connected to the drive plate 15, and the drive plate 15 is therefore swung up into the operating position in a direction indicated by the arrow 105 as a result of the release of the spring 77. With this movement of the drive plate 15 the take-up mandrel 17 engages the hub 4b in the cassette 4, and the capstan 32 and the locating pin 33 are moved into the relevant openings in the raised front portion 4a of the cassette 4. On the drive plate 15 a leaf spring 106 is arranged, which during the pivotal movement of the drive plate 15 in the direction of the arrow 105 is first moved against the auxiliary frame 38 and then, as the drive plate 15 is pivoted further, assists in pushing up the auxiliary frame 38 with the transmission means 41 and the supply mandrel 43 arranged on this frame. This movement, indicated by the arrow 107, causes the supply mandrel 43 to engage the associated hub 4c in the cassette 4. The principal advantage of the auxiliary frame 38, which is arranged on the chassis to be movable perpendicularly thereto and which is coupled to the pivotal drive plate 15 by the leaf spring 106, is that it provides an adequate displacement of the supply mandrel 43 and ensures that enough space remains available at the front of the apparatus, for example in the case of a car radio, to accommodate control keys or push-buttons on the front panel of the car radio.

In the movement of control member 63 in the direction of the arrow 98, an edge portion 108 of the member 63 engages a rotary plate 109 which is arranged to be pivotable on the chassis 1 about a pivotal axis 110. As a result of this the rotary plate 109 is moved about the axis 110 in the direction of the arrow 111. The rotary plate 109 comprises a hook 112, which initially retains a lug 113 which forms part of the head support 8. The pivotal movement of the plate 109 in the direction of the arrow 111 releases the lug 113 from the hook 112. An over-center spring 116 (FIG. 2) then pivots the head support 8 towards the cassette 4 about the spindle 9 in the direction of the arrow 116. A spring 115 is attached to the head support 8 and to the chassis 1, and a spring 114 is attached to the head support 8 and to a pin 117 on a pressure-roller lever 118. The pin 117 is guided along an edge 117a of the chassis 1, and with the pressure-roller lever 118, the pin 117 is pivotable on the head support 8 about an axis 118a. During the pivotal movement of the head support 8 in the direction of the arrow 116 under the influence of the spring 115, the spring 114 pulls the pin 117 against the edge 117a. As this edge is disposed substantially tangentially relative to the spindle 9, the pressure roller 7 remains in a slightly retracted position relative to the head support 8. The spring 114 cannot pivot the pressure-roller lever 118 about the axis 118a relative to the head support until the pin 117 has reached the end of the edge 117a, so that the pressure-roller lever 118 is not pivoted until the last stage of the pivotal movement of the head support 8 is reached. In this way first the magnetic head 6 moved towards the magnetic tape in the cassette 4 and subsequently the pressure roller 7 is rapidly positioned against the capstan 32. The main advantage of this movement in stages is that the spindle 9 may be arranged comparatively close to the pressure roller 7, so that the head support 8 occupies a minimal space in the apparatus, while the spring 114 provides sufficient pressure for the pressure roller on the capstan 32. Since the winding mandrels 17 and 43 have already entered the cassette, the mandrel 17 and the capstan 32 are already rotating, and the pressure roller is now positioned against the capstan, the play mode of the apparatus is obtained and the signals on the tape can now be played back.

B. PAUSE-SEARCH MODE

In this mode the recorder can detect a pause of sufficient length between two passages on the tape which are modulated with signals, upon which detection the apparatus switches from a fast-winding mode to the play mode, starting with the next modulated passage on the tape. During searching the motor 16 rotates with the same speed as during fast winding, but tape transport is effected, at a speed which is for example, a maximum of 10% lower because of the friction, among other things, between the magnetic head and the magnetic tape. Searching is possible in two winding directions of the magnetic tape and therefore the button 11 can be pivoted in two opposite directions in a horizontal plane.

Figure 2:
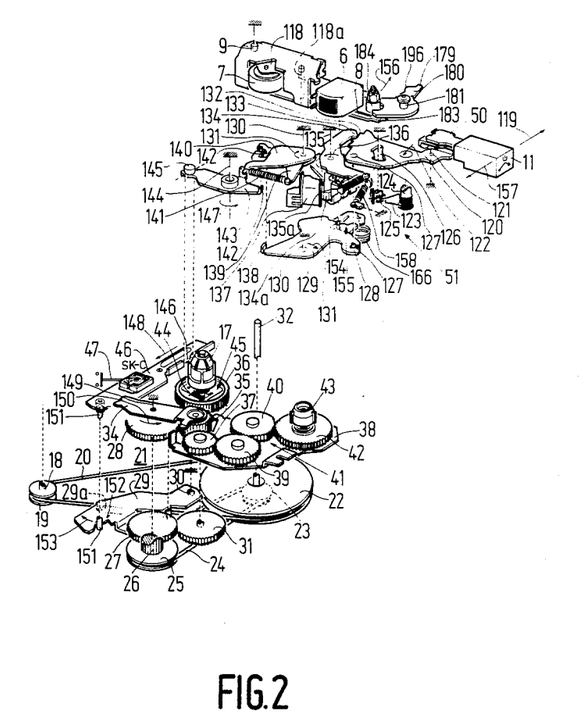
FIG. 2 is an exploded perspective view of parts of the apparatus of FIG. 1 in the pause-search mode of operation.

FIG. 2 represents the situation in which the button 11 is moved to the right, indicated by an arrow 119. From this pivotal movement a number of movements of the switching mechanism behind the button 11 are derived. For example, as a result of the button movement a plate 120 is pivoted in the direction of the arrow 122 about a spindle 121 mounted on the chassis 1. The coupling between the lug 50 and the plate 120 is such that if the button 11 is moved in the counter-clockwise direction, as indicated by arrow 119, the plate 120 is pivoted in the counter-clockwise direction. The pivotal movement of the plate 120 takes place against the force of one of the limbs of a torsion spring 123, which is wrapped around a pin 124 on the plate 120 and which, depending on the movement of the plate, bears with the other limb against a pin 125 which is connected to the chassis 1 and which extends through a slot 126 in the plate 120. Thus, the spring 123 always tends to pivot the button 11 into the neutral center position.

The plate 120 also carries a pin 127 which is disposed in an opening 128 in a pivotal member 129. This member is pivotable about a spindle 130 connected to the chassis 1 and, upon the pivotal movement of the plate 120, is pivoted in the direction of the arrow 131. The plate 120 comprises a number of cams 132, which are engageable with a hook 133 formed on a plate 134 which is pivotable relative to the chassis 1 about an axis 135. The movement of the plate 120 in the direction of the arrow 122 causes a pivotal movement of the plate 134 about the axis 135 in the direction of the arrow 136. A projection 138 on one pivotal member 129 bears against a member 140 which is also pivotable relative to the chassis about the spindle 130. The member 140 consequently pivots in the direction of the arrow 131 about the spindle 130. The member 140 has a recess in which a projection 142 on a bell-crank lever 143 engages, which lever is pivotable relative to the chassis about a pivotal axis 144. A plate 139 also is arranged on the spindle 130, which plate is pivoted by a spring 141 during the pivotal movement of the member 140, the plate 139 thus being urged against the projection 142. The bell-crank lever 143 has a projection 145 which serves to guide the lever 143 at its end which is remote from the spindle 144 in a plane which is perpendicular to said spindle. The edges of the lever 143 near the projection 145 engage a recess 146 in the switching bar 46. The movement of the member 140 and the plate 139 in the direction of the arrow 131 causes the lever 143 to pivot in a direction of the arrow 147 about its spindle 144. As a result, the switching bar 46 is moved in the direction of the arrow 148, so that the switch 47 is actuated and a solenoid 137 is energized.

Figure 3:
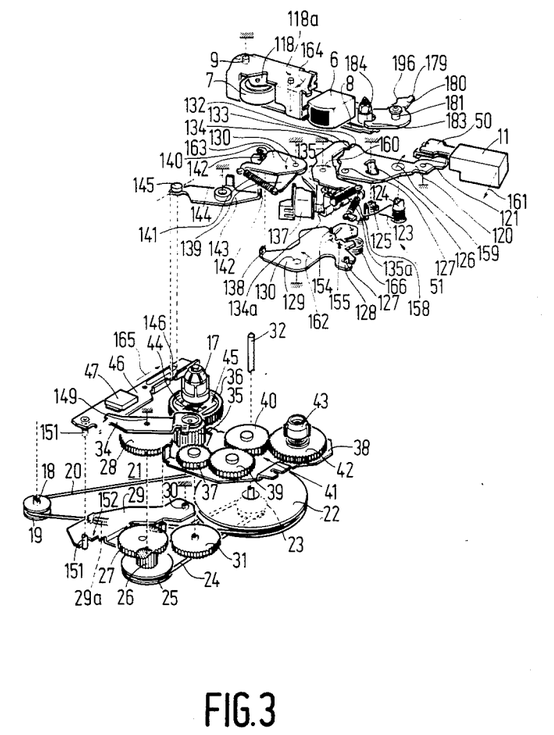
FIG. 3 is an exploded perspective view of parts of the apparatus of FIG. 1 in the fast wind mode of operation.

When the lever 143 has reached an end position, the button 11 moves the member 140 slightly further, so that the plate 139 presses against the projection 142 and further tensions the spring 141. The further movement of the button 11 is necessary to ensure that the plate 134 passes over the cam 132 and can swing back. Swinging-back is effected in that an armature member 134a is pivoted about the spindle 135 in the direction of arrow 160 by a tension spring 158 (FIG. 3). A tension spring 135a arranged between the plate 134 and the armature member 134a ensures that the plate 134 is also pivoted back. As in the meantime the solenoid 137 has been energized, the plate 134 is thus latched, so that the button 11 is latched in the pivoted position. However, the tension spring 135a enables the button 11 to be moved back manually. Also, as a result of this change-over of the switch 47 the motor 16 receives a higher voltage and consequently begins to run faster to provide the desired faster tape transport. This means that the switch 47 is the play/wind switch of the motor 16.

The swing arm 34 is pivotable relative to the drive plate 15 about a pivotal axis 149, and is coupled to the switching bar 46. Thus, the movement of the switching bar 46 in the direction of the arrow 148 results in the arm 34 being pivoted in the direction of the arrow 150. A pin 151 is connected to the switching bar 46, which pin is movable over cams 152 formed on the arm 29. A movement of the pin 151 over the cams 152 in the direction of the arrow 148 results in the arm 29 being pivoted about the spindle 30 in the direction of the arrow 153 against the action of the spring 29a. As a result of this, the idler wheel 28 is disengaged from the gear-wheel 31. The faster motor speed is now imparted to the gear-wheel 36 via the gear-wheel 35, so that the take-up mandrel 17 will wind the tape at a higher speed.

On the underside of the head support 8 is a pin 154 which can run along an edge 155 of the pivotal member 129 having a stepped profile. In the play mode the pin 154 is located on that part of the edge 155 which is situated at a short distance from the spindle 130. As a result of the movement of the member 129 in the direction of the arrow 131 the pin 154 is moved over a first part of the edge 155, so that the head support 8 with the magnetic head 6 moves approximately 1.6 mm backwards relative to the cassette 4 in a direction indicated by the arrow 156, the head remaining in contact with the magnetic tape, or at such a small distance from the tape that a satisfactory signal is produced. The solenoid 137 latches the mechanism during winding, so that the actuating button 11 may be released. This is necessary because otherwise the mechanism would pivot back under the influence of the spring 123. This is the case both during the pause-search mode and during normal fast winding.

When the button 11 is pivoted in a direction opposite to the arrow 119, as indicated by the arrow 157, the gear-wheel 35 will mesh with the gear wheel 37. It is evident that the supply mandrel 43 is then driven instead of the take-up mandrel 17. The tape is then wound in the opposite direction. Upon detection of a pause an electric circuit, not shown, in the apparatus is actuated, which circuit de-energizes the solenoid 137. As a result of this the armature member 134a no longer keeps the pivotal plate 134 latched, so that as shown in FIG. 3 the plate 120 is moved back in the direction of an arrow 159 under the influence of the switching spring 123. This results in the plate 134 sliding over the cam 132 and subsequently being moved in the direction of the arrow 160. This gives rise to a movement of the button 11 in the direction of the arrow 161, so that the button 11 is urged back into the center position. This is a sign for the user of the magnetic-tape cassette apparatus that a pause is found. This may also be of advantage if no further modulation is contained on the tape, because in that case the button 11 also springs back.

Upon the movement of the plate 120 in the direction of the arrow 159 the pivotal member 129 is pivoted in the direction of the arrow 162 via the pin 127. This ensures that the member 140 moves back in the direction of the arrow 163 and, via the pin 154, the head support 8 with the magnetic head is moved back in the direction of the arrow 164. Thus, the magnetic head returns to the play position in the cassette. Via the bellcrank lever 143 the switching bar 46 is subsequently moved back in the direction of the arrow 165, so that the switch 47 is changed over and the motor voltage is reduced again, thereby reducing the speed of the motor 16. Also, the idler wheel 35 is disengaged from the gear-wheel 36 as a result of the movement of the arm 34. Since during the movement of the switching bar 46, the arm 29, under the influence of the spring 29a, assumes its original position, the idler wheel 28 again establishes a connection between the small gear-wheel 26 and the gear-wheel 31.

The movement of the head support 8 in the direction of the arrow 164 is possible because the pin 154 is urged in the direction of the arrow 164 by means of the comparatively strong over-center spring 166. During the last stage of the return movement of the head support the faster movement of the pressure roller lever 118 is obtained, as already described. It is to be noted that the present method of switching the apparatus, upon detection of a pause, can also be obtained if, during fast rewinding of the tape towards the supply mandrel 43, the tachometer 45 detects the stationary condition of the gear-wheel 36 when the leading tape end is reached. The solenoid 137 is then de-energized, the motor speed is reduced, the drive means 21 is switched to the play mode, and the playback of the signals on the magnetic tape is repeated automatically (so-called "auto-replay").

If during fast winding of the tape to the take-up mandrel 17 the tachometer 45 detects the stationary condition of the gear-wheel 36 and thus the end of the tape, the solenoid 137 is de-energized, but in addition, the switching bar 48 is unlatched, so that via the switch 49 the solenoid 93 is also de-energized and the apparatus is switched to the pause mode (see D).

Figure 4:
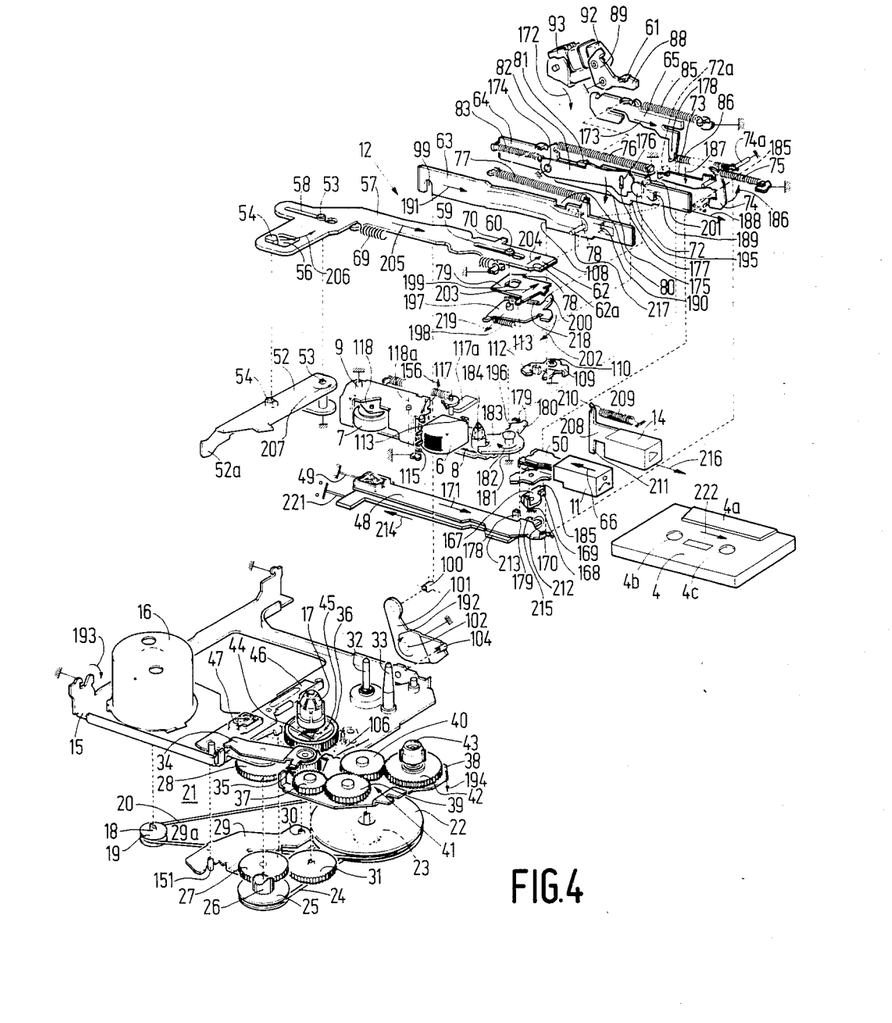
FIG. 4 is an exploded perspective view of the parts of the apparatus of FIG. 1 in the pause-eject mode of operation.

The pause-search mode may also be terminated mechanically. This is effected by briefly pressing the button 14 (FIGS. 1 and 4). As a result of this an electric switch 221 is actuated, which also causes the solenoid 137 to be de-energized. Subsequently, the apparatus is switched to the normal play mode.

C. FAST-WIND MODE

The fast-wind position of the button 11 is obtained by pivoting the button further in the direction 119 or 157 in FIG. 2. In fact, the situation obtained is the same as described for the pause-search mode (B). However, in this case the pin 125 reaches the end of the slot 126. The larger pivotal movement of the plate 120 causes the pin 154 to have a larger stroke, so that the head support 8 is not moved over a small distance of approximately 1 mm as in the case of pause detection, in which a moderate head-to-tape contact exists, but is moved backwards over a larger distance in the direction of the arrow 156, so that the head is spaced from the tape. The stepped edge 155 of the member 129 determines the three positions of the head support 8 in the positions "play", "search" and "fast wind" of the button 11 (see A, B and C, respectively). The other movements during fast winding correspond to the movement already described under B. It is to be noted that returning to the play mode can be effected not only upon reaching the end of the tape or upon depression of the play button 14 but also by resetting the button 11 to the center position.

D. PAUSE/EJECT MODE

This position is shown in FIG. 4. The eject position can only be reached through the pause position.

By pressing the button 11 substantially halfway in the direction of the arrow 66 a release member 167 is coupled to the lug 50. The member 167 is pivotable about a spindle 168, and as a result of the depression of the button 11 the member 167 pivots to bring a projection 169 thereon against a projection 170 on the switching bar 48. The bar 48 is then moved in the direction of the arrow 171 and the switch 49 is changed over. Consequently, the supply voltage to the motor 16 is interrupted, as a result of which the capstan 32 stops and the drive means 21 and the winding mandrel coupled thereto also stop. As a result of the change-over of the switch 49 the play solenoid 93 is no longer energized, so that the bell-crank lever 89 is pivoted back in the direction of the arrow 172 by the force exerted by the spring 85 through the lug 61. As a result of this movement the play member 65 is no longer latched behind the cam 88, so that the pause spring 85 is released and moves the play member 65 back in the direction of the arrow 173.

The movement of the member 65 causes the lug 81 to force the auxiliary member 82 to pivot downwards about a spindle 174 in the direction of the arrow 175, against the force of the spring 83. This movement is limited by a pin 177 which is connected to the member 64 and which extends into a slot 176 in the auxiliary member 82. As a result of the movement of the play member 65 in the direction of the arrow 173 the spring 86, by which the member 65 is coupled to the switching bar 48, is also released. A hook portion 178 of the member 65 then abuts a stop 179 on the bar 48. During the movement of the member 65 in the direction of the arrow 173 the hook portion 178 is coupled to a pivotal member 180 which is pivotally supported by a spindle 181 on the chassis. Thus, the release of the spring 85 ultimately results in the pivotal member 180 being pivoted in the direction of the arrow 182, so that the head support 8 pivots back about the spindle 9 in the direction of the arrow 156. To cause this movement a bifurcated portion 183 of the pivotal member 180 pushes against a pin 184 on the head support 8. The displacement of the head support is approximately 1.5 mm, which substantially corresponds to the situation shown in FIG. 2 during the pause-search mode. It differs from the situation shown in FIG. 2 in that during the search for pauses on the magnetic tape the motor 16 keeps rotating, whereas it is now stationary. The movement of the head support in the direction of the arrow 156 is opposed by the force of the two springs 115 and 166. As a result, these springs are tensioned again. The pin 117 of the pressure-roller lever 118 is again urged against the edge 117a of the chassis 1.

At this instant the pause situation is reached. If the button 11 has been depressed completely in the direction of the arrow 66, this results in the release member 167 being pivoted further, so that another projection 185 on the member 167 causes the main latch constituted by the hook 74 to move in the direction of the arrow 186. As a result, the part of the hook 74 on which the edge 73 is formed will make a downward movement in the direction of the arrow 187. Consequently, the switching member 64 is now unlatched because the spindle 72a is freed. The member 64 then abruptly moves in the direction indicated by the arrow 188 under the influence of the spring 76. The member 64 has a projection 189 on one side which cooperates with a projection 190 on one side of the control member 63 during the movement of the member 64 in the direction 188, so that the member 63 is moved in a direction indicated by the arrow 191. Because of the engagement of the pin 100 on the pivoted member 101 in the recess 99 in the member 63 the movement of the latter member in the direction of arrow 191 is converted into a pivotal movement of the member 101 in the direction of the arrow 192, so that the drive plate 15 is swung down in the direction of the arrow 193. As a result, the winding mandrel 46 is withdrawn from the cassette, the capstan 32 and the locating pin 33 being also disengaged from the cassette. During the movement of the drive plate 15 in the direction of the arrow 193 the leaf spring 106 also returns the auxiliary frame 38 and the transmission means 41 arranged on this frame in the direction of the arrow 194, the winding mandrel 43 being thereby withdrawn from the cassette. During the movement of the switching member 64 in the direction of the arrow 188 a shoulder 195 on the switching member 64 moves against a further stop 196 on the pivoted member 180. As the travel of the member 64 is much larger than that of the member 65, the movement of the member 64 results in a larger displacement of the head support 8 in the direction of the arrow 156 than does the movement of the member 65 upon depression of the button 11 in order to obtain the pause mode. Thus, the head support 8 is moved into the fully pivoted position. In this position the magnetic head 6 and the pressure roller 7 are completely withdrawn from the cassette 4.

The pivotal member 197 which carries the spindle 60 is arranged underneath the latching member 79. The member 197 is coupled to the member 79 by a tension spring 198. The spindle 60 extends through an opening 199 in the member 79. A lug 200 on the member 197 is positioned against a shoulder 201 on the switching member 64 at the end of the movement. When the member 64 moves in the direction of the arrow 188 the lug 200 is pivoted in the direction of the arrow 202 about a stop, not shown, on the chassis 1. As a result the spring 198 is tensioned and the lug 87 is moved in the direction of the arrow 203. The lug 78 then slides against the side of the control member 63 until, during the movement of this member in the direction of the arrow 191, the recess 80 meets the lug 78 and the lug engages the recess. As a result, the member 63 is latched. The movement of the member 197 in the direction of the arrow 203 also moves the spindle 60, situated in the opening 199, in the direction of the arrow 203. This movement is transmitted to the ejection member 57, which is now moved in the direction indicated by the arrow 204. As a result of that movement, the edge 62a of the end portion 62 of the member 57 is disengaged from behind the support 10 on the chassis 1 and the spring 69 is thereby released to slide the member 57 forward in the guide slot 13 in the direction of the arrow 205. During this movement the pin 54 is positioned against the edge of the hole 56 under the influence of the force exerted by the spring 69, and the pin 54 moves along that edge in the direction of the arrow 206. Also during that movement the free end 52a of the ejection lever 52 is moved against the cassette 4, so that the cassette is no longer clear of the ejection lever. Subsequently, the ejection lever is pivoted about the spindle 53 in the direction of the arrow 207, so that the cassette is pushed out of the cassette compartment in the direction of the arrow 222. The advantage of coupling the ejection lever 52 at a later stage is that prior to this all elements of the apparatus which are coupled to the cassette (winding mandrils, capstan, magnetic head) can be withdrawn from the cassette.

To return from the pause mode of the apparatus to the play mode only the play button 14 need be depressed (FIGS. 1 and 4). The end of the button 14 is rigidly connected to a bar 208, a tension spring 209 being arranged between a bar end 210 and the chassis 1. Upon depression of the button 14 the spring 209 is tensioned slightly. A projection 211 on the bar 208 engages a recess 212 in a switching bar 213 which is guided on the chassis 1 directly adjacent the switching bar 48. The switching bar 213 will therefore be moved in the direction of the arrow 214. As a result of this, a projection 215 on the switching bar 213 engages the hook portion 178 of the play member 65, with the result that the member 65 is again moved in the direction of the arrow 84 in FIG. 1 and the spring 86 again moves the switching bar 48 in the direction of the arrow 87.

The button 14 can now be released, so that the spring 209 is released and the button 14, with the bar 208, is moved back in the direction indicated by the arrow 216, thereby returning the projection 215 and hence the switching bar 213 to the rest position. The movement of the switching bar 48 and the play member 65 causes the armature 92 to be positioned against the play solenoid 93 and the play solenoid to be re-energized, so that the lug 61 is again latched behind the cam 88. Due to this movement of the play member 65 and with it the hook portion 178 thereof the pivotal member 180 is freed, so that the head support 8 pivots back in the direction of the arrow 164 (see FIG. 3) into the play position under the influence of the force exerted by the spring 166.

As a result of the movement of the switching bar 48 the motor 16 is started again, so that the pressure roller 7 is now positioned against the capstan 32 and the play mode is started. In this way it is ensured that, when the apparatus is switched to the pause mode owing to the release of the play solenoid 93 and of the bell crank lever or pause latch 89, in principle only the pause spring 85 and the coupling spring 86 are released, but the other springs which have been tensioned during insertion of the cassette, specifically the relatively strong springs 69 and 76, remain tensioned. Thus, when the apparatus is again set to the play mode by depression of the button 14 only the two springs 85 and 86 have to be tensioned again, which demands only a moderate force. As a result of this most of the energy produced by inserting the cassette into the apparatus remains conserved in the apparatus when the apparatus is set to the pause mode.

A further advantage of switching to the pause mode by means of the construction described is that the solenoid 93 makes it possible to obtain the pause mode electrically. For this reference is made to the remark under B as regards the detection of the end of the tape during winding onto the take-up mandrel 17. This precludes undesired pressure on the pressure roller and consequent damage to the pressure roller if the user has not noted that the end of the tape has been reached. A similar situation may occur if the apparatus is switched off without the button 11 being deliberately depressed and the cassette being ejected. When the apparatus is switched off the solenoid 93 is de-energized and the pressure roller 7 is disengaged from the capstan 32.

Another possibility is the use of the pause mode if the magnetic-tape cassette apparatus is used in conjunction with a car radio. This yields the advantage that, if the supply voltage is turned off, which may happen if the driver turns off the car ignition, the tape deck is switched to the pause mode so that the pressure roller is disengaged from the capstan.

Another possibility in the case of use in a car is that, if so-called traffic information is reproduced by the car radio, the signal used for this purpose electronically supplies a control signal to the magnetic-tape cassette apparatus. Suitably, if the apparatus is in the play mode, the control signal only stops the motor 16 electronically, so that upon termination of the traffic-information broadcast the motor is re-started immediately without the pressure roller and the head 6 being withdrawn from the tape, because in this situation the solenoid remains energized. If the apparatus is in the pause-search mode or fast-wind mode respectively the solenoid 93 remains energized during a traffic-information broadcast. The solenoid 137 (FIG. 2) is de-energized, so that the situation is the same as upon reaching the end of the tape in the rewind mode. As soon as the traffic-information message has ended the motor 16 is started with the normal speed and the apparatus is in the play mode.

It is to be noted that the apparatus in accordance with the invention makes it possible for a large number of parts required for the many functions that can be performed to be accommodated in a comparatively small space. Furthermore, the buttons 11 and 14 are constructed so that only a small stroke and a small force are required, while the control button 11 combines a plurality of functions.

I claim:
1. A cassette recorder comprising:
   a chassis,
   a head support mounted on the chassis for movement with respect to the chassis, and a pressure roller and a magnetic head mounted on the support,
   an ejection spring,
   a cassette compartment for receiving a magnetic cassette,
   an ejection lever pivotably mounted to said chassis, and arranged such that, upon insertion of a cassette into said compartment the lever is pivoted in an insertion direction to an end position so as to tension the ejection spring,
   a capstan arranged for driving a magnetic tape in a cassette placed in the compartment, and drive means for driving the capstan and for transporting the tape past the magnetic head,
   switching means for moving the head support toward the cassette,
   means, responsive to pivoting of said lever in said insertion direction, for actuating said switching means to move the head support toward the cassette,
   characterized by comprising an ejection member arranged to be movable with respect to said chassis in at least a first direction between a rest position and an actuated position,
   means for connecting the ejection spring to the ejection member arranged such that the ejection spring is tensioned by movement of the member in said first direction,
   latching means for latching the ejection member in an actuated position, and
   means for coupling the ejection member to the ejection lever, at least during insertion of the cassette, arranged such that said ejection member is moved from the rest position to the actuated position in response to said pivoting of said lever in said insertion direction, and the ejection lever can be pivoted freely over at least a given distance, relative to the ejection member, when the ejection member is in the actuated position; and that, upon release of said latching means, said ejection member moves from the actuated position to the rest position under the influence of said ejection spring, the force of the tensioned ejection spring pivoting said ejection lever to eject an inserted cassette from the compartment.

2. A recorder as claimed in claim 1, characterized in that said ejection member includes a stop against which the ejection lever bears while the ejection spring is being tensioned, in the actuated position said ejection member being arranged such that the ejection lever is freely pivotable between stops relative to the ejection member.

3. A recorder as claimed in claim 2, characterized in that said means for coupling comprises a pin and hole connection having a clearance between the pin and the hole, edges of the hole constituting the stops for limiting free pivoting of the ejection lever when the ejection member is in the actuated position.

4. A recorder as claimed in claim 1, 2 or 3 characterized by comprising a spindle about which the ejection lever is pivoted, said spindle also serving as a guide for movement of sad ejection member in the first direction.

5. A cassette recorder comprising:
a chassis,
a head support mounted on the chassis for movement with respect to the chassis, and a pressure roller and a magnet head mounted on the support,
an ejection spring,
a cassette compartment for receiving a magnetic cassette,
an ejection lever pivotably mounted to said chassis, and arranged such that upon insertion of a cassette into said compartment said lever is pivoted in an insertion direction to an end position so as to tension the ejection spring,
a capstan arranged for driving a magnetic tape in a cassette placed in the compartment, and drive means for driving the capstan and for transporting the tape past the magnetic head,
switching means for moving the head support toward the cassette, and
means, responsive to pivoting of said lever in said insertion direction, for actuating said switching means to move the head support toward the cassette,
characterized by comprising an ejection member arranged to be movable with respect to said chassis in a first direction from a rest position a first distance toward an actuated position, and after movement over said first distance to be movable in a second, different direction to said actuated position,
means for connecting the ejection spring to the ejection member arranged such that the ejection spring is tensioned by movement of the member said first distance in said first direction,
latching means for latching the ejection member in an actuated position, and
means for coupling the ejection member to the ejection lever, at least during insertion of the cassette, arranged such that said ejection member is moved said first distance from the rest position in response to said pivoting of said lever in said insertion direction, and such that upon movement of said member in said second direction to the actuated position the ejection lever is free to pivot over at least a given distance relative to the ejection member.

6. A recorder as claimed in claim 5, characterized in that said means for coupling comprises a pin and hole connection having a clearance between the pin and the hole, edges of the hole constituting stops for limiting free pivoting of the ejection lever when the ejection member is in the actuated position.

7. A recorder as claimed in claims 5 or 6 characterized by comprising a spindle about which the ejection lever is pivoted, said spindle also serving as a guide for movement of said ejection member in the first direction.

8. A recorder as claimed in claim 6, characterized in that said means for connecting is arranged such that, during tensioning, the ejection spring urges the ejection member pivotally about said pin in said second direction of movement.

9. A recorder as claimed in claim 8, characterized in that said chassis comprises a guide slot in which said ejection member is further guided, said ejection member having a narrowed end portion which upon completion of movement in the first direction is pivoted in the second direction in the guide slot, an edge of the guide slot functioning as part of the latching means for preventing a further movement of the ejection bracket in the first direction after the movement in the second direction.

10. A recorder as claimed in claim 9, characterized by comprising a pivotal member having a guide spindle mounted thereon, and in that said ejection member has a slot through which said guide spindle passes such that the ejection member slides on said guide spindle while moving in the first direction, and during movement of the ejection member in the second direction said guide spindle is displaced.

11. A recorder as claimed in claim 10, characterized by comprising a latching member,
a drive plate movably mounted to said chassis, said capstan and at least a portion of said drive means being mounted to the drive plate for rotation with respect to the plate,
a control member forming part of said switching means, for controlling movement of the drive plate and the head support towards the cassette, and
means for coupling said latching member to said guide spindle so as to unlatch said control member.

12. A recorder as claimed in claim 11, characterized in that said switching means further comprises a switching member coupled through the switching spring to the control member, during a part of the movement of said ejection member in the first direction said switching member being coupled to the ejection member for tensioning said switching spring, after unlatching of the conrol member said switching spring causing the control member with the latching pin to be moved to the active position.

13. A recorder as claimed in claim 12, characterized in that said switching member is arranged so that in the coupled position the switching memnber tends to pivot the ejection member about the spindle through the slot in the second direction of movement, under the influence of forces exerted by the switching spring in conjunction with the ejection spring.

14. A recorder as claimed in claim 12 characterized by comprising an actuating button and means for coupling the actuating button to the control member, so as to move said switching member by spring force, during which movement the switching member is coupled to the control member and returns the control member and latching pin to the latched initial position.

15. A recorder as claimed in claim 14, characterized in that said said means for coupling includes a spring coupling said pivotal member to said latching member, and in that upon actuation of said actuating button the control member is coupled to the pivotal member for returning said latching member to the position in which the control member is latched, said latching member moves said guide spindle and with it said end portion of the ejection member in a direction opposite said second direction of movement so as to unlatch and permit return movement of the ejection member to the rest position by release of the ejection spring force, during which release said ejection lever is pivoted from the end position so as to eject the cassette from the cassette compartment.

16. A recorder as claimed in claim 11, characterized in that said switching means further comprises a latching pin carried on said control member and forming part of the latching means, and a switching spring arranged for moving said latching pin into an active position after unlatching of said control member, in said active position said latching pin being coupled to the ejection member so as to latch the ejection member in the actuated position.

17. A recorder as claimed in claim 16, characterized in that said switching means further comprises a switching member coupled through the switching spring to the control member, during a part of the movement of said ejection member in the first direction said switching member being coupled to the ejection member for tensioning said switching spring, after unlatching of the control member said switching spring causing the control member with the latching pin to be moved to the active position.

18. A recorder as claimed in claim 17, characterized in that said switching member is arranged so that in the coupled position the switching member tends to pivot the ejection member about the spindle through the slot in the second direction of movement, under the influence of forces exerted by the switching spring in conjunction with the ejection spring.

19. A recorder as claimed in claim 18 characterized by comprising an actuating button and means for coupling the actuating button to the control member, so as to move said switching member by spring force, during which movement the switching member is coupled to the control member and returns the control member and latching pin to the latched initial position.

20. A recorder as claimed in claim 19, characterized in that said said means for coupling includes a spring coupling said pivotal member to said latching member, and in that upon actuation of said actuating button the control member is coupled to the pivotal member for returning said latching member to the position in which the control member is latched, said latching member moves said guide spindle and with it said end portion of the ejection member in a direction opposite said second direction of movement so as to unlatch and permit return movement of the ejection member to the rest position by release of the ejection spring force, during which release said ejection lever is pivoted from the end position so as to eject the cassette from the cassette compartment.

* * * * *